US009606305B1

(12) United States Patent
Yu et al.

(10) Patent No.: US 9,606,305 B1
(45) Date of Patent: Mar. 28, 2017

(54) OPTICAL ENGINE FOR DATA COMMUNICATION

(71) Applicant: SAE Magnetics (H.K.) Ltd., Hong Kong (HK)

(72) Inventors: Xiaoming Yu, Hong Kong (HK); Vincent Wai Hung, Hong Kong (HK); Gad Joseph Hubahib Gaviola, Hong Kong (HK); Margarito P. Banal, Jr., Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 14/933,010

(22) Filed: Nov. 5, 2015

(51) Int. Cl.
*G02B 6/42* (2006.01)
*G02B 6/32* (2006.01)
*G02B 6/43* (2006.01)

(52) U.S. Cl.
CPC ............ *G02B 6/4214* (2013.01); *G02B 6/32* (2013.01); *G02B 6/4204* (2013.01); *G02B 6/425* (2013.01); *G02B 6/428* (2013.01); *G02B 6/4219* (2013.01); *G02B 6/4244* (2013.01); *G02B 6/4246* (2013.01); *G02B 6/4259* (2013.01); *G02B 6/4292* (2013.01); *G02B 6/43* (2013.01); *G02B 6/424* (2013.01)

(58) Field of Classification Search
None
See application file for complete search history.

(56) References Cited

U.S. PATENT DOCUMENTS

| 7,539,367 | B2 * | 5/2009 | Tamura | G02B 6/4214 385/14 |
| 8,335,411 | B2 * | 12/2012 | Kuznia | G02B 6/4214 385/14 |
| 8,469,610 | B2 * | 6/2013 | Shao | G02B 6/4292 385/76 |
| 8,641,296 | B2 * | 2/2014 | Nishimura | G02B 6/425 385/31 |
| 8,676,006 | B2 * | 3/2014 | Morioka | G02B 6/4214 385/14 |
| 8,995,806 | B2 * | 3/2015 | Lam | G02B 6/32 385/33 |
| 9,128,248 | B2 * | 9/2015 | Lam | G02B 6/32 |
| 2004/0202477 | A1 * | 10/2004 | Nagasaka | G02B 6/4292 398/138 |
| 2010/0215325 | A1 * | 8/2010 | Tamura | G02B 6/4206 385/89 |
| 2013/0216190 | A1 * | 8/2013 | Haley | G02B 6/4292 385/79 |

(Continued)

FOREIGN PATENT DOCUMENTS

CN WO 2012079448 A1 * 6/2012 ........... G02B 6/4244

*Primary Examiner* — Michelle R Connelly

(57) ABSTRACT

An optical engine for data communication includes a substrate, an array of optical semiconductor devices mounted on the substrate, a device lens block mounted on the substrate and formed with a cavity for accommodating the array of optical semiconductor devices, a jumper lens block coupled with the device lens block at an upper surface thereof, and a fiber array mounted on the jumper lens block and optically coupled with the array of optical semiconductor devices. The jumper lens block is aligned with the device lens block by alignment posts and notches. A metal latch is used to hold the jumper lens block on the device lens block.

20 Claims, 14 Drawing Sheets

(56) References Cited

U.S. PATENT DOCUMENTS

| | | | |
|---|---|---|---|
| 2013/0266260 A1* | 10/2013 | Morioka | G02B 6/4214 |
| | | | 385/33 |
| 2015/0247984 A1* | 9/2015 | Konishi | G02B 6/4214 |
| | | | 385/88 |

* cited by examiner

OPTICAL ENGINE FOR DATA COMMUNICATION

FIELD OF THE TECHNOLOGY

The present application relates to an optical engine for data communication.

BACKGROUND

Due to increasing popularity of mobile data applications, clouding computing and Internet of Things (IoT), there is a growing demand for switching & computing capacities within data centers. This creates an increasing demand for capacity and density of interconnect between switches, computing nodes and storage devices. Production of high-speed optical transceiver and active optical cable (AOC) based on short-reach multi-mode fiber optics is the solution for addressing such demand. As the per-port data rate of data center switches reaches 100 Gb/s nowadays and will soon increase beyond 400 Gb/s and 1 Tb/s, there is a need for a scalable optical engine to facilitate rapid development of cost-effective high-speed and high-density multi-mode (MM) optical interconnect solutions. As the size of data centers gets larger, there is also a need for longer transmission distances, e.g., beyond 500 meters. Hence, it is desirable to produce a scalable optical engine that facilitates the realization of low-cost, high-speed and high-density optical transceiver and transponder solutions in order to meet the challenges of modern data center interconnect demands.

The above description of the background is provided to aid in understanding the optical engine for data communication, but is not admitted to describe or constitute pertinent prior art to the optical engine for data communication.

SUMMARY

According to one aspect, there is provided an optical engine for data communication which may include a substrate defining a longitudinal axis; an array of optical semiconductor devices transversely mounted on the substrate, the optical semiconductor devices being selected from the group consisting of transmitting optoelectronic components, receiving optoelectronic components and a combination thereof; a device lens block mounted on the substrate and formed with a cavity for accommodating therein the array of optical semiconductor devices, wherein two device lens arrays are formed on two opposite sides of the device lens block respectively; a jumper lens block coupled with the device lens block at an upper surface thereof, wherein the jumper lens block is formed with a first alignment portion configured to snugly engage with a second alignment portion formed on the device lens block so as to facilitate precise optical alignment of the jumper lens block with the device lens block, and a lens array formed on a total internal reflective surface disposed at an angle of 45 degrees with respect to the substrate; and a fiber array mounted on the jumper lens block and optically coupled with the array of optical semiconductor devices via one of the device lens arrays of the device lens block and the lens array of the jumper lens block. The optical engine may further include a metal latch for holding the jumper lens block in a fixed position on the device lens block. The metal latch may include a first portion detachably coupled with the device lens block and a second portion contacting and biasing the jumper lens block against the device lens block. In one embodiment, the fiber array is disposed parallel to the substrate.

In one embodiment, the total internal reflective surface may reflect light from the fiber array to the array of optical semiconductor devices when receiving optical signals, and reflecting light from the array of optical semiconductor devices to the fiber array when transmitting optical signals. The lens array of the jumper lens block may be an elliptical lens array.

In one embodiment, one of the device lens arrays can be used for transmitting optical signal, and the other one of the device lens arrays can be used for receiving optical signal.

In one embodiment, the second alignment portion may be in the form of two pair of alignment notches formed on two opposite sides of the device lens block respectively. Each pair of alignment notches can be used to receive therein the first alignment portion of the jumper lens block which can be in the form of a pair of alignment posts formed on the jumper lens block.

In one embodiment, the optical engine may include two arrays of optical semiconductor devices disposed end-to-end and optically associated with two side-by-side device lens block, and two side-by-side fiber arrays mounted on two side-by-side jumper lens blocks and optically coupled with the two arrays of optical semiconductor devices respectively.

In one embodiment, the optical engine may include two arrays of optical semiconductor devices extending respectively along two opposite sides of the cavity perpendicular to the longitudinal axis of the substrate, and two end-to-end fiber arrays mounted on two end-to-end jumper lens blocks and optically coupled with the two arrays of optical semiconductor devices respectively.

In one embodiment, the optical engine may include two arrays of optical semiconductor devices extending respectively along two opposite sides of the cavity of the device lens block, and two fiber arrays mounted on two jumper lens blocks. The jumper lens blocks may include two lens arrays formed respectively on two total internal reflective surfaces disposed at an angle of 45 degrees with respect to the substrate, and the two fiber arrays may be optically coupled with the two arrays of optical semiconductor devices via the two lens arrays respectively.

In one embodiment, the transmitting optoelectronic components may be vertical cavity surface emitting lasers, and may be connected to a driving integrated circuit.

In one embodiment, the receiving optoelectronic components may be photodiodes and may be connected to a driving integrated circuit.

In one embodiment, the first alignment portion of the jumper lens block may be in the form of two alignment posts, and the second alignment portion of the device lens block may be in the form of two alignment notches formed on two opposite sides of the device lens block respectively, whereby the two alignment posts of the jumper lens block are insertable into the two alignment notches of the device lens block respectively.

In one embodiment, the metal latch may include (i) two locking slots formed on two opposite sides of the metal latch at a middle portion thereof for engagement with two locking hooks formed on the device lens block at a middle portion thereof; (ii) two flexible arms extending longitudinally from the middle portion at a first end thereof, at least one protrusion formed on a bottom surface of each arm for contacting and pressing the jumper lens block on the device lens block, two inturned ends being formed on free ends of the two arms for abutting against an end surface of the jumper lens block; and (iii) two U-shaped springs extending from the middle portion at a second end thereof for contacting and biasing the device lens block against the substrate. The metal latch may further include two protrusions extending longitudinally from the two locking slots respectively to facilitate unlatching of the metal latch from the device lens block.

In one embodiment, the optical engine may further include a metal latch for locking the jumper lens block in a fixed position on the device lens block. The metal latch may include two locking slots formed on two opposite sides of the metal latch at a middle portion thereof for engagement with two locking features formed on the device lens block at a middle portion thereof; and a first pair of flexible arms extending longitudinally from the middle portion at a first end thereof for contacting and pressing one of the two first jumper lens blocks on the device lens block. The metal latch may further include a second pair of flexible arms extending longitudinally from the middle portion at a second end thereof for contacting and pressing the other one of the two jumper lens blocks on the device lens block.

According to another aspect, there is provided an optical transceiver having an optical engine as disclosed in the present application, wherein one array of optical semiconductor devices may include an array of transmitting optoelectronic components for transmitting optical signals, and the other array of optical semiconductor devices may include an array of receiving optoelectronic components for receiving optical signals.

According to a further aspect, there is provided an optical transponder module having an optical engine as disclosed in the present application.

Although the optical engine for data communication is shown and described with respect to certain embodiments, it is obvious that equivalents and modifications will occur to others skilled in the art upon the reading and understanding of the specification. The optical engine for data communication in the present application includes all such equivalents and modifications, and is limited only by the scope of the claims.

BRIEF DESCRIPTION OF THE DRAWINGS

Specific embodiments of the optical engine for data communication will now be described by way of example with reference to the accompanying drawings wherein.

DETAILED DESCRIPTION

Figure 1:
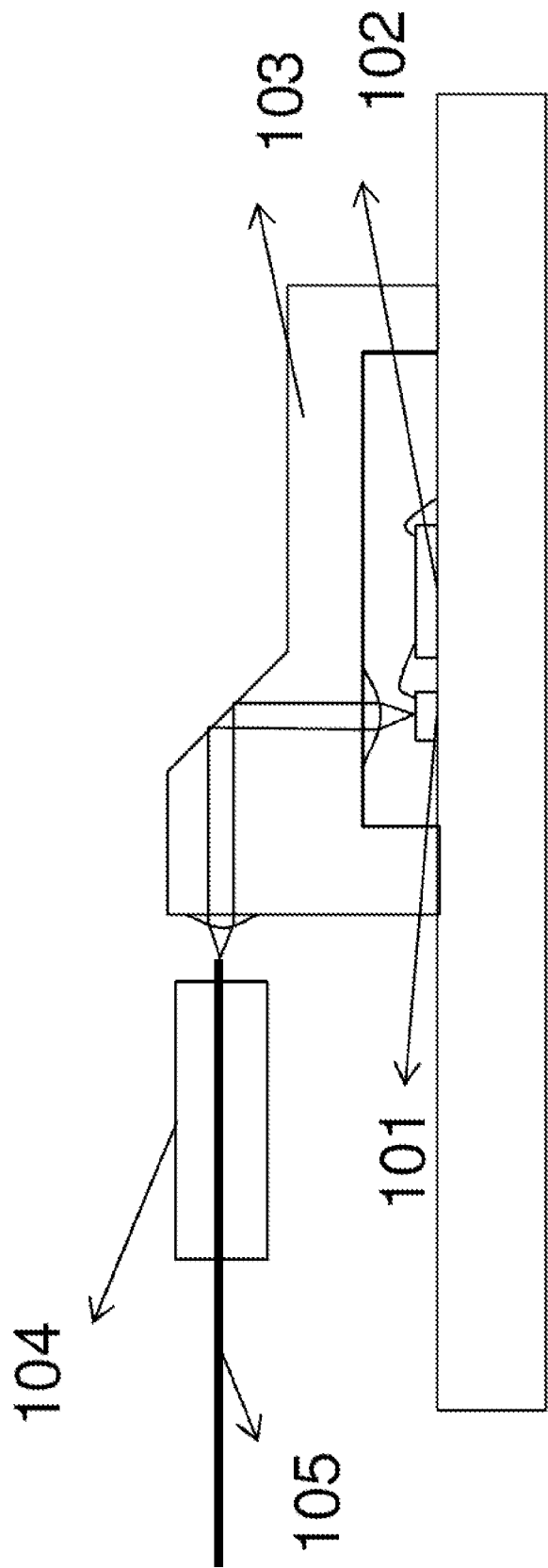
FIG. 1 is an optical engine of the prior art.

Reference will now be made in detail to a preferred embodiment of the optical engine for data communication, examples of which are also provided in the following description. Exemplary embodiments of the optical engine for data communication are described in detail, although it will be apparent to those skilled in the relevant art that some features that are not particularly important to an understanding of the optical engine for data communication may not be shown for the sake of clarity.

In addition, improvements and modifications which may become apparent to persons of ordinary skill in the art after reading this disclosure, the drawings, and the appended claims are deemed within the spirit and scope of the protection.

For illustration purposes, the terms such as "upper", "lower", "vertical", "horizontal", "top" and "bottom" appeared hereinafter relate to the invention as it is oriented in the drawings. It is understood that the invention may assume various positions, except where expressly specified to the contrary.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical, electrical or optical communication with another element.

As used herein, "a" or "an" means at least one, unless clearly indicated otherwise.

FIG. 1 is an optical engine of the prior art. An array of optical semiconductor devices 101 and a device driving integrated circuit (IC) 102 are disposed in a cavity of an optical-electrical (OE) lens block 103. A jumper lens and a fiber array 105 are optically coupled with the OE lens block 103. This optical engine has a high jumper-to-lens alignment accuracy requirement. It is difficult to measure the true lens to vertical cavity surface emitting laser (VCSEL)/photodiode (PD) alignment. It is also difficult to produce these complex lens blocks having multiple lens and total internal reflective (TIR) surfaces. It is not flexible to change fiber orientation in this optical engine. Furthermore, optimized transmitter Tx and receiver Rx require different lens blocks.

FIGS. 2-5 show different views of a first embodiment of an optical engine for data communication of the present application. The optical engine for data communication may include a circuit substrate 200 defining a longitudinal axis X. An array of optical semiconductor devices 202 may be transversely mounted on the substrate 200. The array of optical semiconductor devices may be connected to a driving integrated circuit (IC) 203. The array of optical semiconductor devices 202 may be an array of transmitting optoelectronic components such as a VCSEL array for transmitting optical signals, or an array of receiving optoelectronic components such as a photodiode array for receiving optical signals, or an array of combination of transmitting optoelectronic components and receiving optoelectronic components for transmitting and receiving optical signals.

Figure 3:
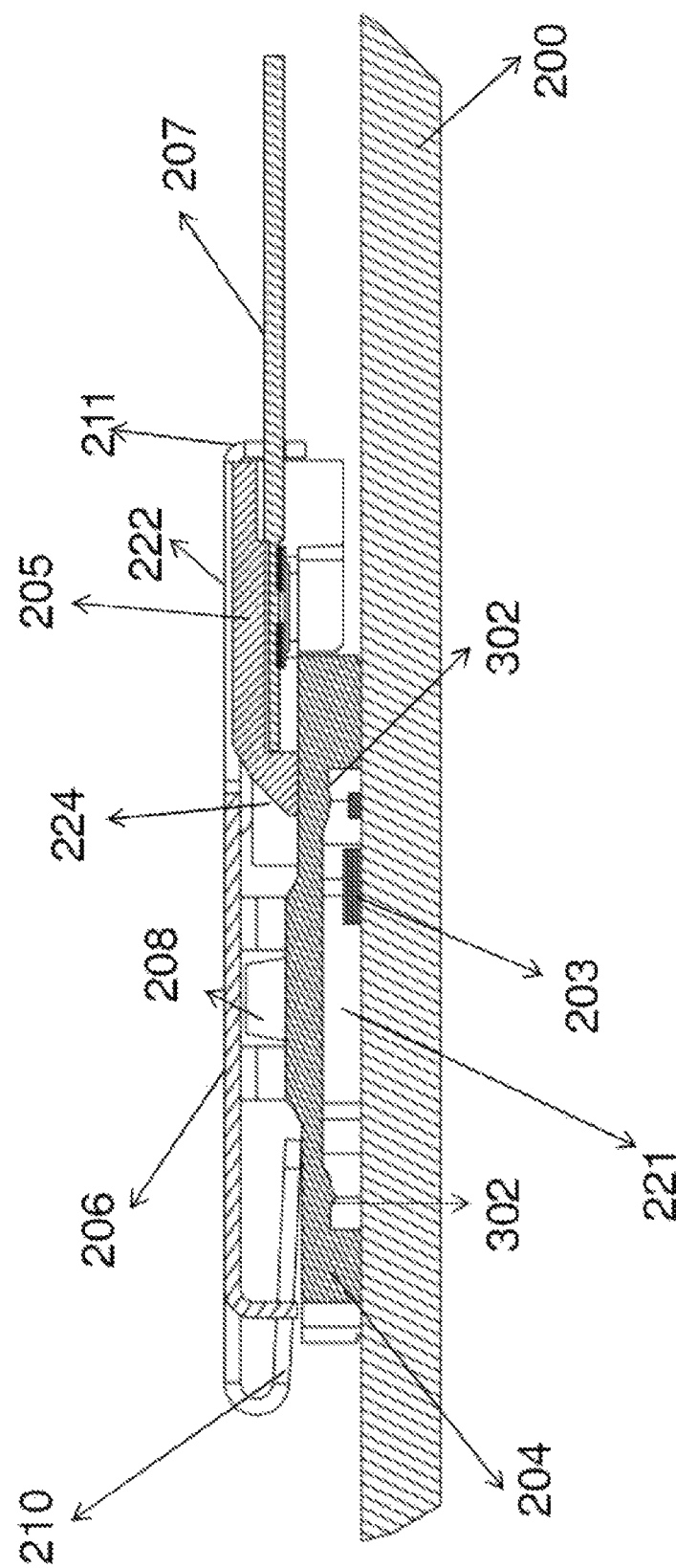
FIG. 3 is a cross sectional view of the first embodiment of the optical engine.

A device lens block 204 may be mounted on the substrate 200 and formed with a cavity 221 for accommodating therein the array of optical semiconductor devices 202, as best illustrated in FIG. 3.

A jumper lens block 205 may be coupled with the device lens block 204 at an upper surface thereof. A fiber array 207 may be mounted on the jumper lens block 205 and optically coupled with the array of optical semiconductor devices 202.

Figure 2:
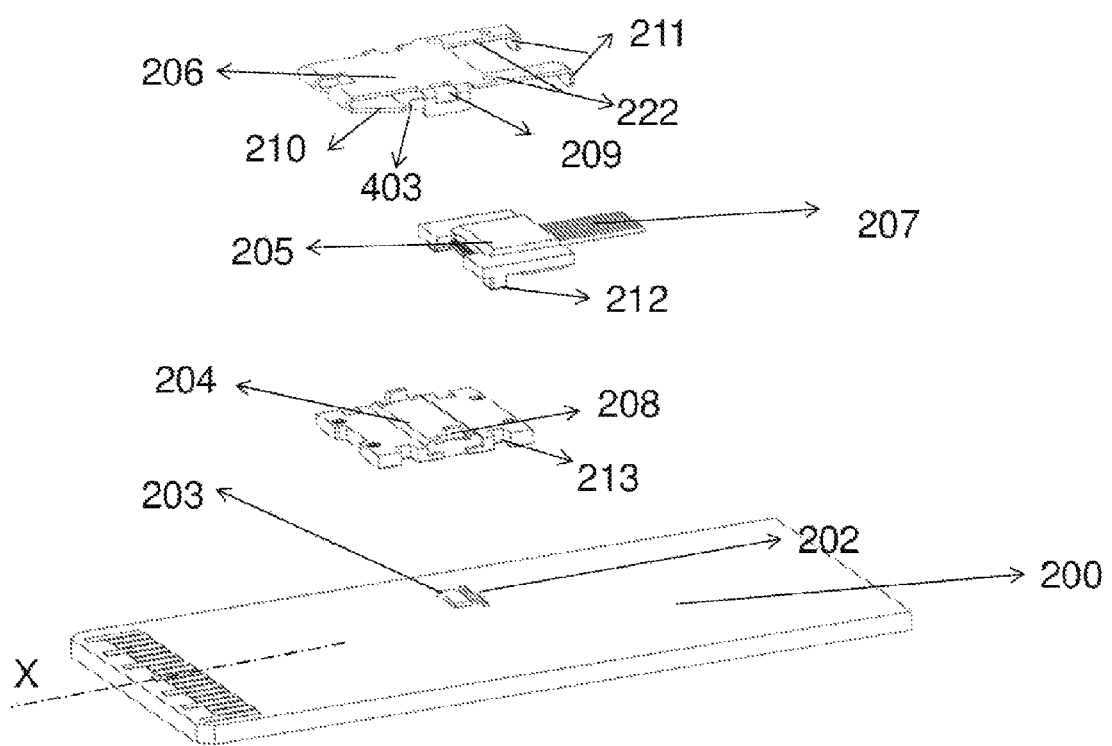
FIG. 2 is an exploded view of a first embodiment of an optical engine of the present application.
Figure 4:
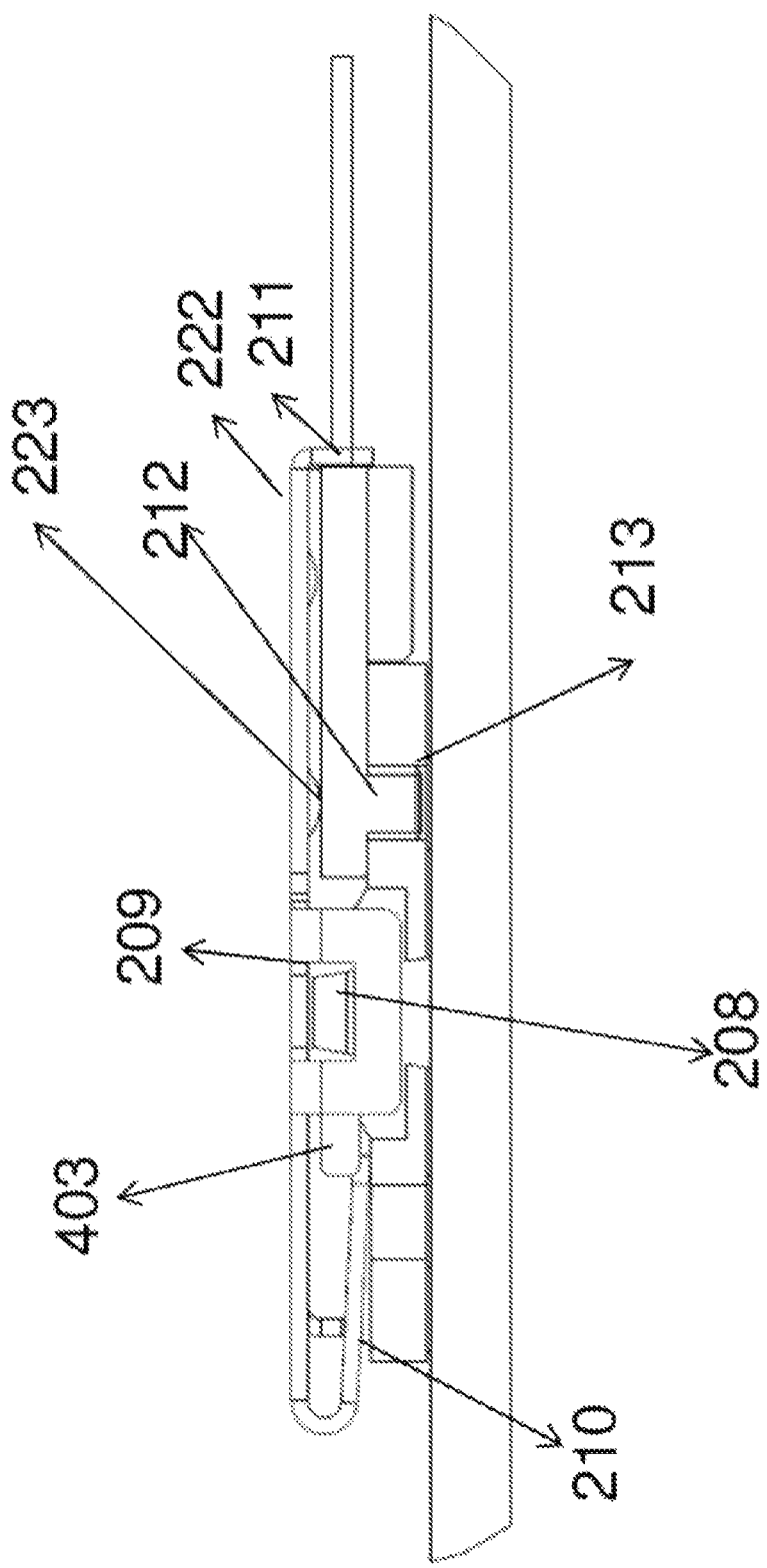
FIG. 4 is a side view of the first embodiment of the optical engine.
Figure 5:
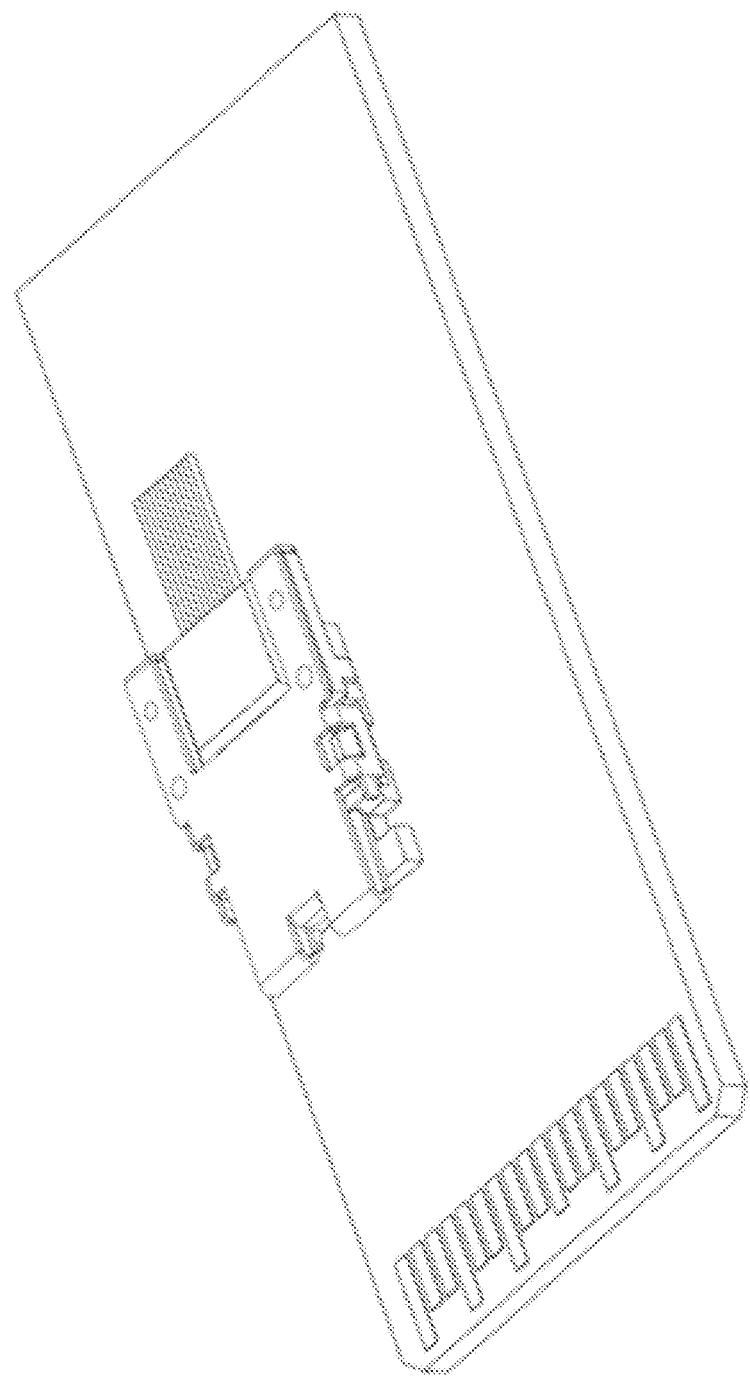
FIG. 5 is an assembly view of the first embodiment of the optical engine.

As illustrated in FIGS. 2, 3 and 4, the jumper lens block 205 may be formed with two alignment posts 212 configured to snugly engage with or insert into two alignment notches 213 formed on two opposite sides of the device lens block 204. The alignment posts 212 may be integrally formed on a bottom surface of the jumper lens block 205. The alignment posts 212 can facilitate precise optical alignment of the jumper lens block 205 with the device lens block 204. Although it has been shown and described that the jumper lens block 205 is provided with two alignment posts 212 insertable into two alignment notches 213 formed on the device lens block 204, it is understood that other possible alignment methods can be used. For example, the device lens block 204 may be provided with two alignment posts insertable into two alignment notches formed on the jumper lens block 205. The jumper lens block 205 and the device lens block 204 may also be formed with other alignment portions or structures such as pins and pin holes, protrusions and recesses, etc.

A metal latch 206 may be provided to hold the jumper lens block 205 in a fixed position relative to the device lens block 204. The metal latch 206 may include two locking slots 209 formed on two opposite sides of the metal latch 206 at a middle portion thereof for engagement with two locking hooks 208 formed on the device lens block 204 at a middle portion thereof, and two flexible arms 222 extending longitudinally from the middle portion at a first end thereof. At least one protrusion 223 may be formed on a bottom surface of each arm 222 for contacting and pressing the jumper lens block 205 on the device lens block 204. Two inturned ends 211 may be formed on free ends of the two arms 222 for abutting against an end surface of the jumper lens block 205 for preventing it from tilting. Two U-shaped springs 210 may extend from the middle portion at a second end thereof for contacting and biasing the device lens block 204 against the substrate 200. A pair of protrusions 403 may extend longitudinally from the pair of locking slots 209 respectively to facilitate unlatching of the metal latch 206 from the device lens block 204.

In the present embodiment, the fiber array 207 may be disposed inside V-groove 701 parallel to the substrate 200. The jumper lens block 205 may include a total internal reflective surface 224 for reflecting light from the fiber array 207 to the receiving optoelectronic components of the array of optical semiconductor devices 202 when receiving optical signals, and reflecting light from the transmitting optoelectronic components of the array of optical semiconductor devices 202 to the fiber array 207 when transmitting optical signals.

Figure 6:
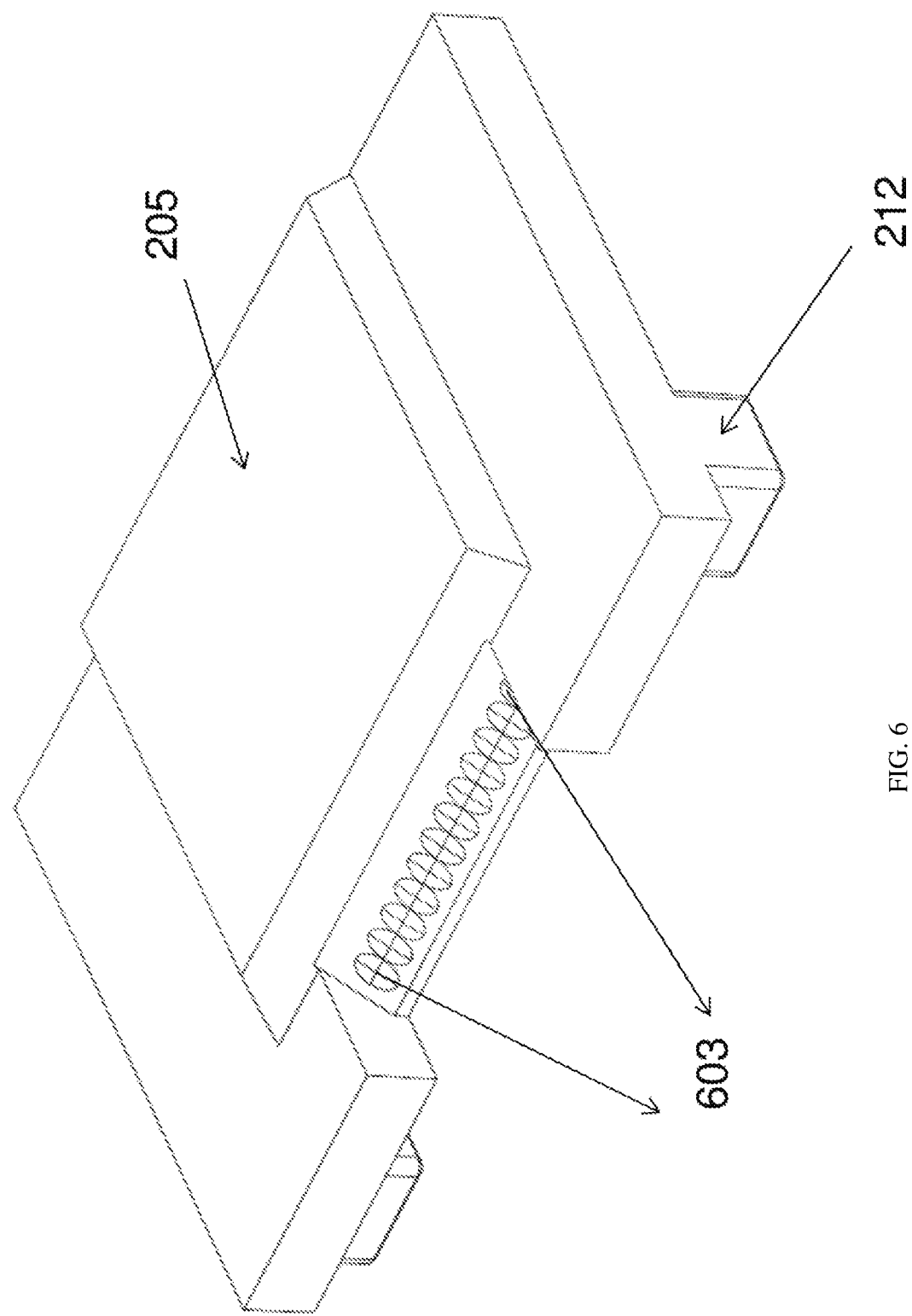
FIG. 6 is a perspective view of a jumper lens block.
Figure 7:
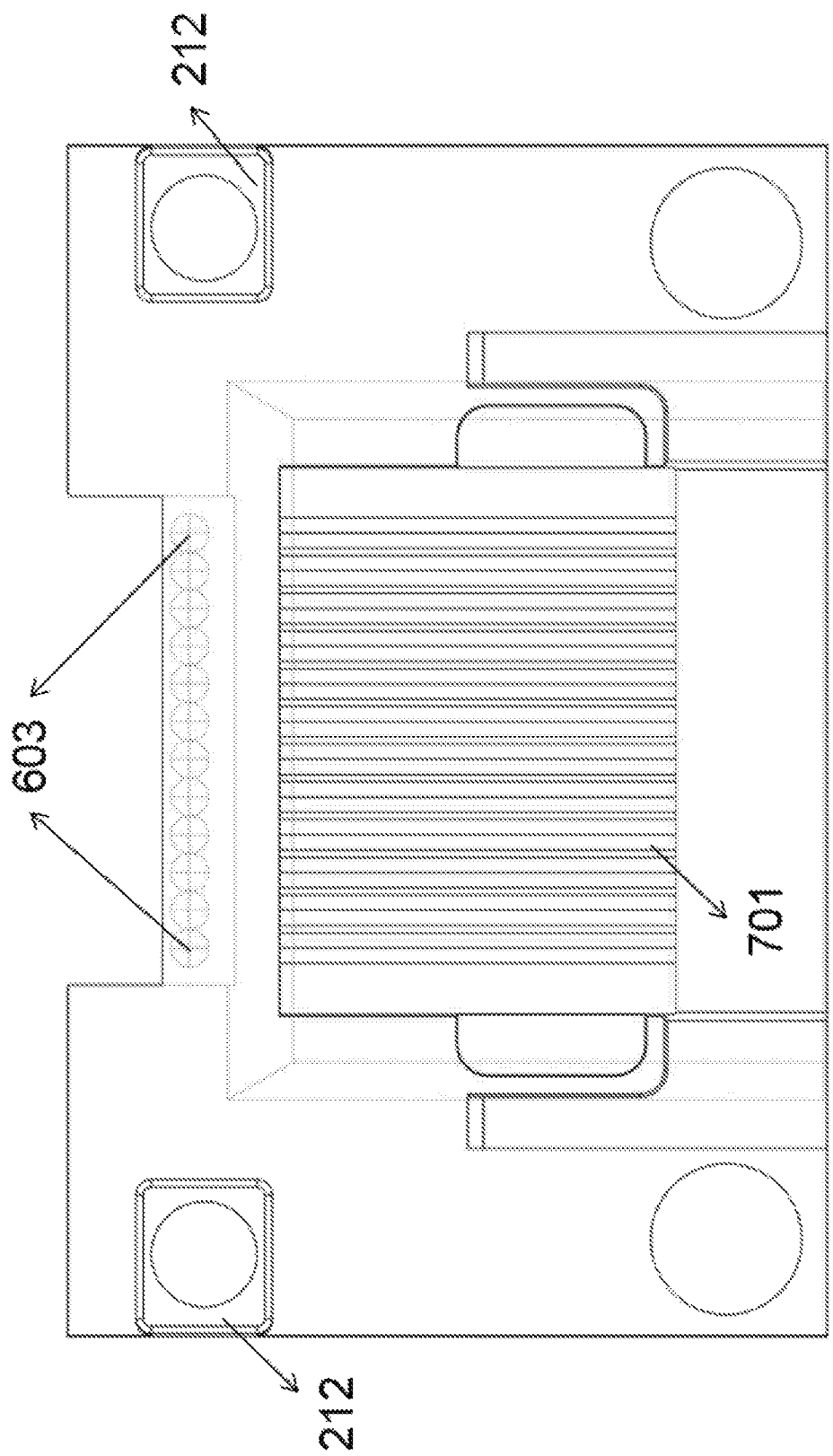
FIG. 7 is a bottom view of the jumper lens block.
Figure 8:
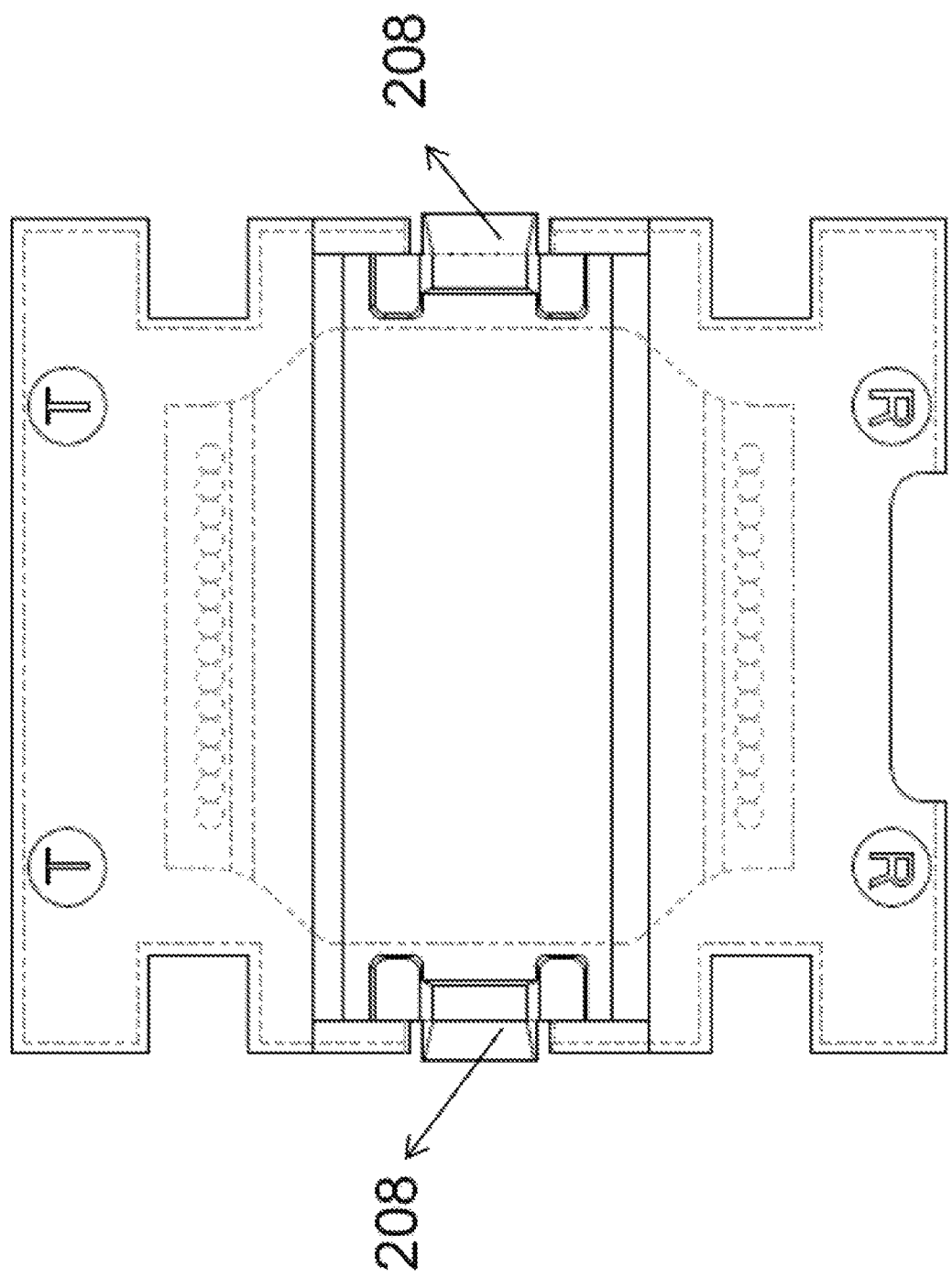
FIG. 8 is a top view of a device lens block.
Figure 9:
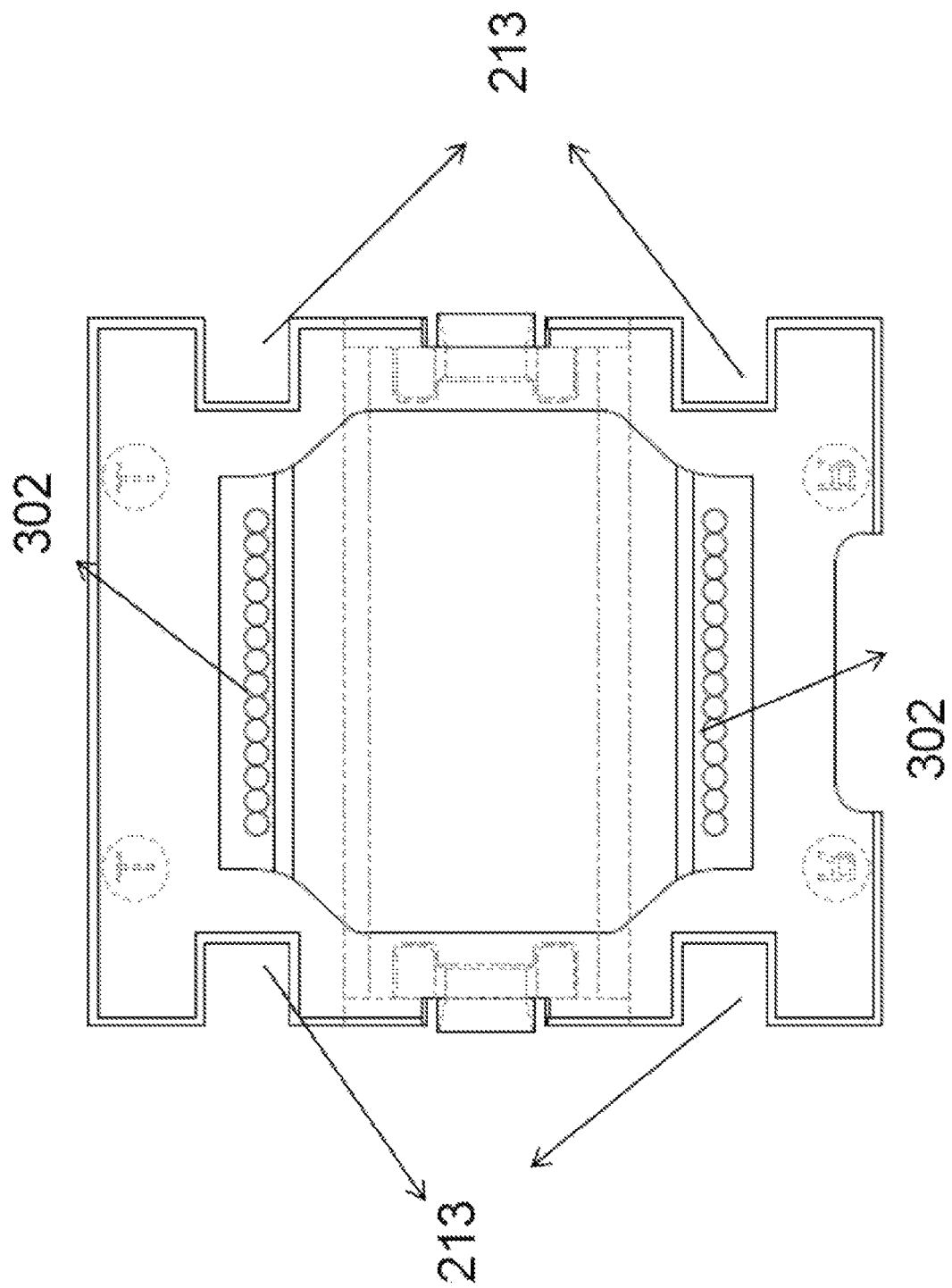
FIG. 9 is a bottom view of the device lens block.

FIGS. 6 and 7 show different views of the jumper lens block 205. The jumper lens block 205 may be formed with two alignment posts 212 configured to insert into two alignment notches 213 formed on two opposite sides of the device lens block 204, as shown in FIGS. 8 and 9. The alignment posts 212 may be integrally formed on a bottom surface of the jumper lens block 205. The alignment posts 212 can facilitate precise optical alignment of the jumper lens block 205 with the device lens block 204. Elliptical lens array 603 may be formed on the total internal reflective surface 224 of the jumper lens block 205. The total internal reflective surface 224 may be disposed at an angle of 45 degrees with respect to the substrate 200.

FIGS. 8 and 9 show different views of the device lens block 204. It can be seen that two device lens arrays 302 may be formed on two opposite sides of the device lens block 204 respectively. One of the device lens arrays 302 may be used for transmitting optical signal, and the other one of the device lens arrays 302 may be used for receiving optical signal. Two pairs of alignment notches 213 may be formed on two opposite sides of the device lens block 204 respectively. Each pair of alignment notches 213 can be used to receive therein a pair of alignment posts 212 of one jumper lens block 205.

A basic embodiment of the optical engine for data communication may adopt 12 channels in quad small form factor pluggable (QSFP) boards. Lens optics may be attached only on one side of the optical engine. Lenses in different functional areas may accommodate different optical systems. Jumper lens blocks can be plugged into two sides of the optical engine to form two different optical coupling systems, e.g., one for transmitter Tx, one for receiver Rx. Two lens arrays, both for transmitter Tx and receiver Rx, may be molded on one piece of lens block. Hence, the application of the optical engine disclosed in the present application is flexible.

Figure 10:
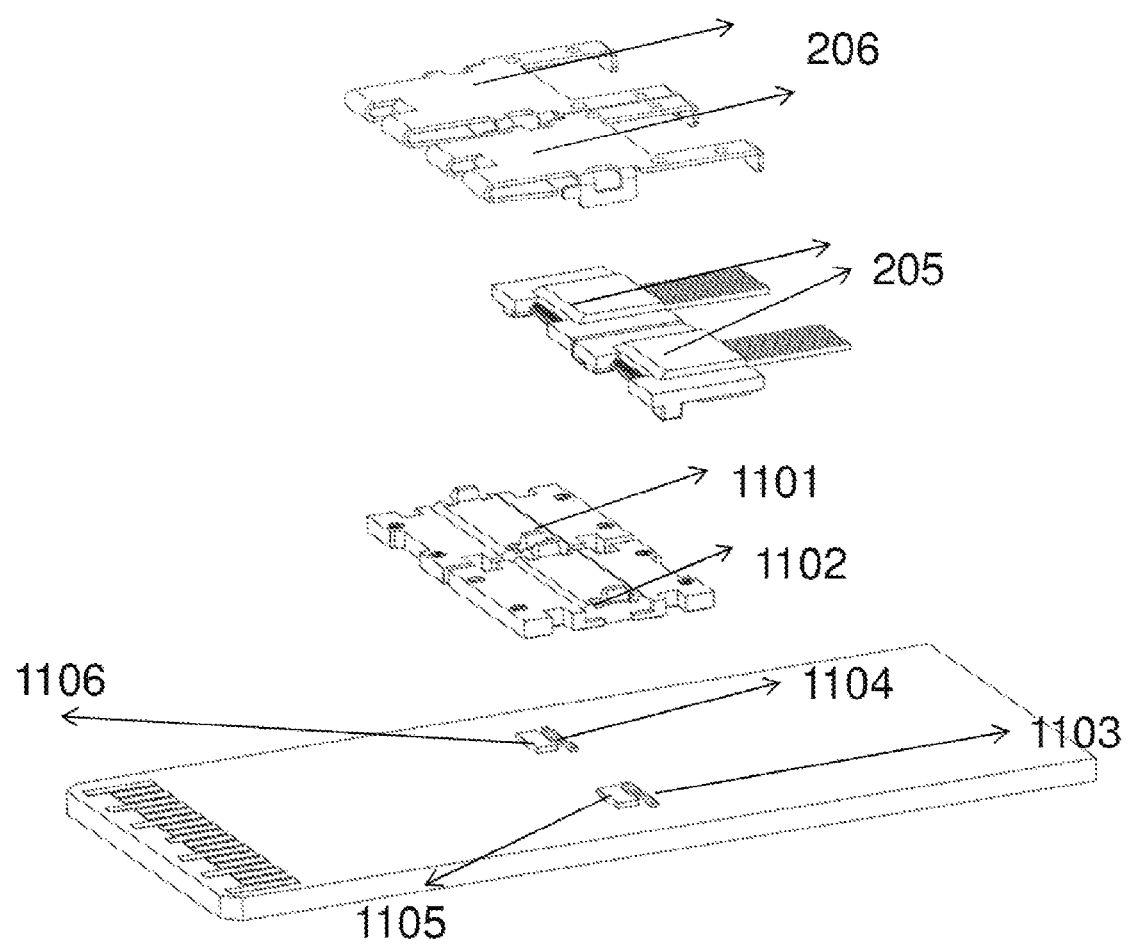
FIG. 10 is an exploded view of a second embodiment of the optical engine.
Figure 11:
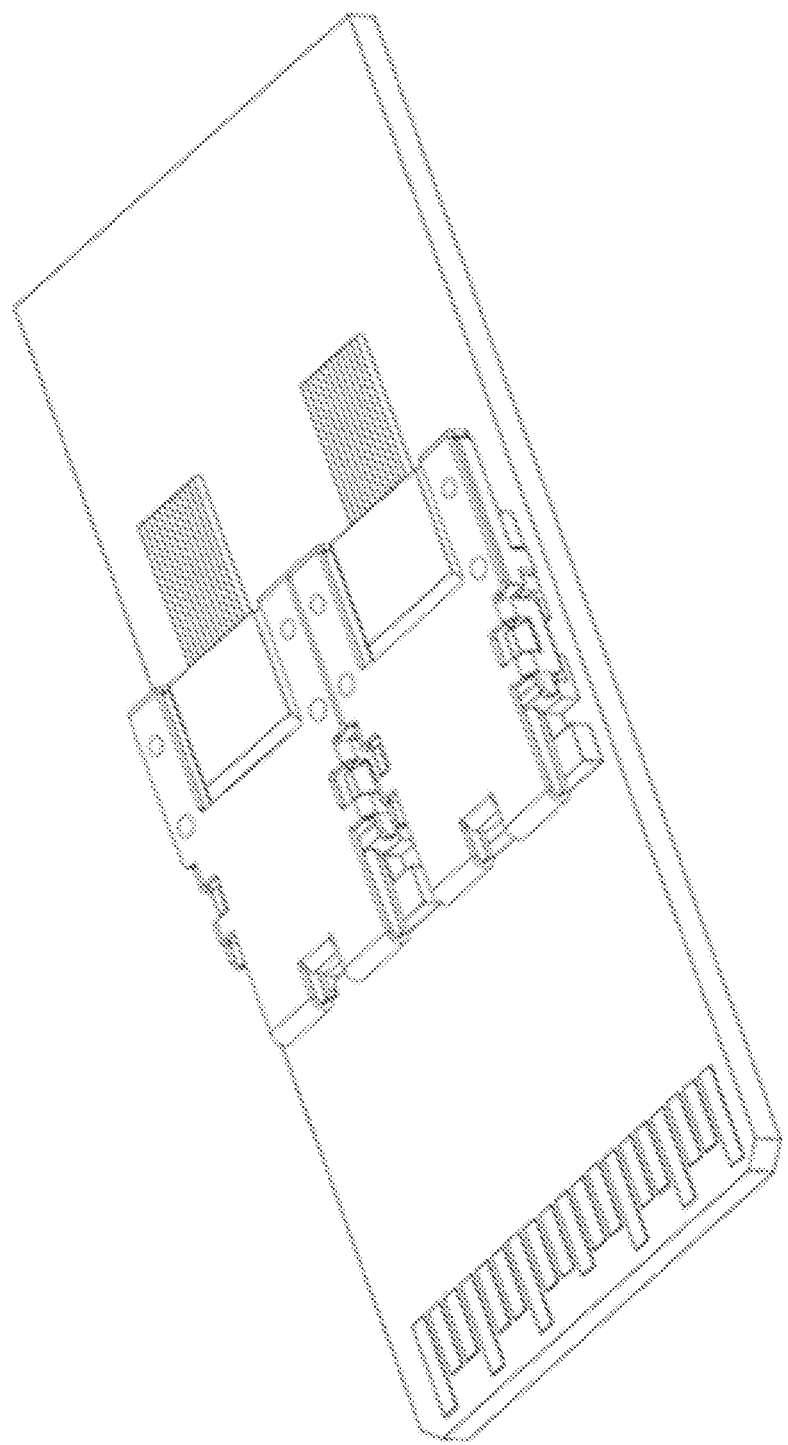
FIG. 11 is an assembly view of a second embodiment of the optical engine.

FIGS. 10 and 11 show different views of a second embodiment of the optical engine. According to this embodiment, there may be two transverse arrays of optical semiconductor devices 1103, 1104 disposed end-to-end and optically associated with two side-by-side device lens blocks 1101, 1102, and two side-by-side fiber arrays 207 mounted on two side-by-side jumper lens blocks 205 and optically coupled with the two arrays of optical semiconductor devices 1103, 1104 respectively. Two lens arrays 603 may be formed on the device lens block 1101, 1102 for coupling light between the two end-to-end arrays of optical semiconductor devices 1103, 1104 and the two fiber arrays 207 provided on the two side-by-side jumper lens blocks 205 respectively. Two metal latches 206 may be provided for holding the two jumper lens blocks 205 in a fixed position relative to the two device lens blocks 1101, 1102 respectively. The two arrays of optical semiconductor devices 1103, 1104 may be connected with two driving integrated circuits 1105, 1106 respectively.

Two 12 channels can be applied to transmit or receive optical signals. This optical engine design can be compatible with current QSFP printed circuit board. It could be extended to more than two 12 channels if needed. If multiple 12 channels are applied, the transmitting speed will go beyond 300G and up to NX300G.

Figure 12:
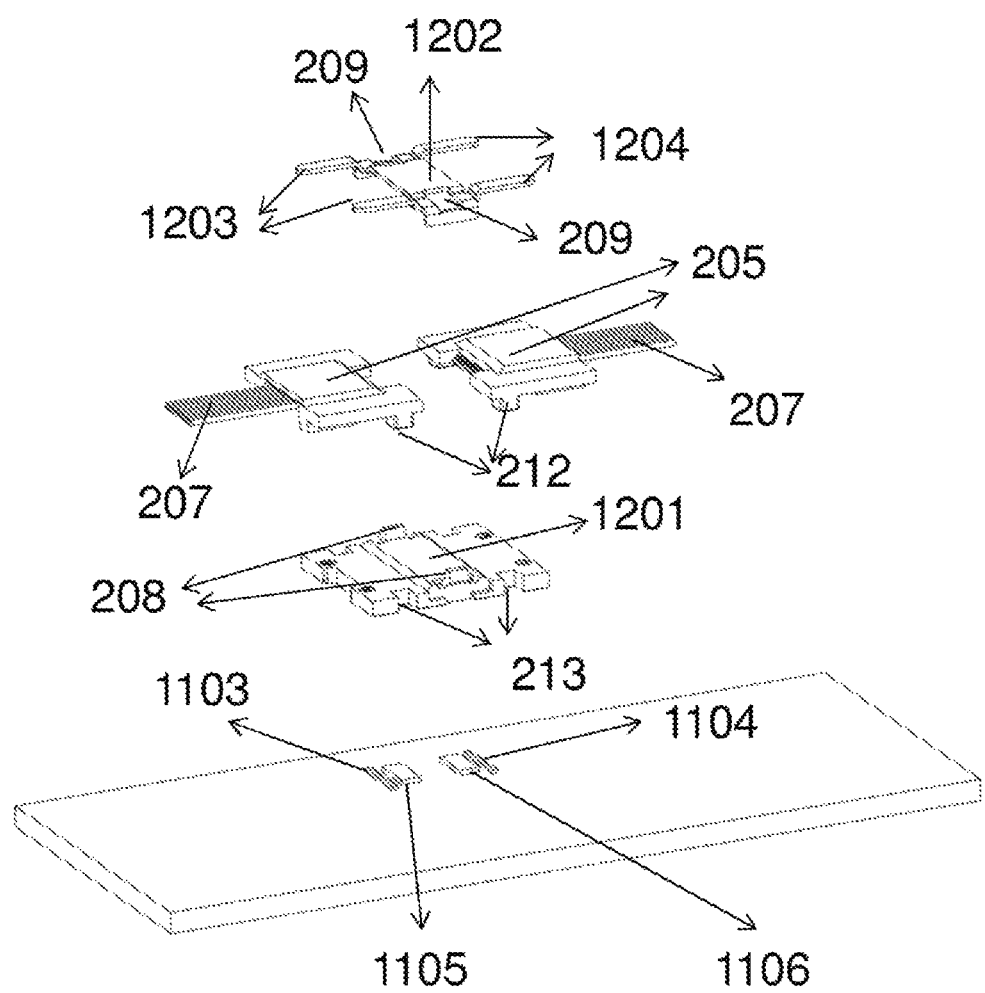
FIG. 12 is an exploded view of a third embodiment of the optical engine.
Figure 13:
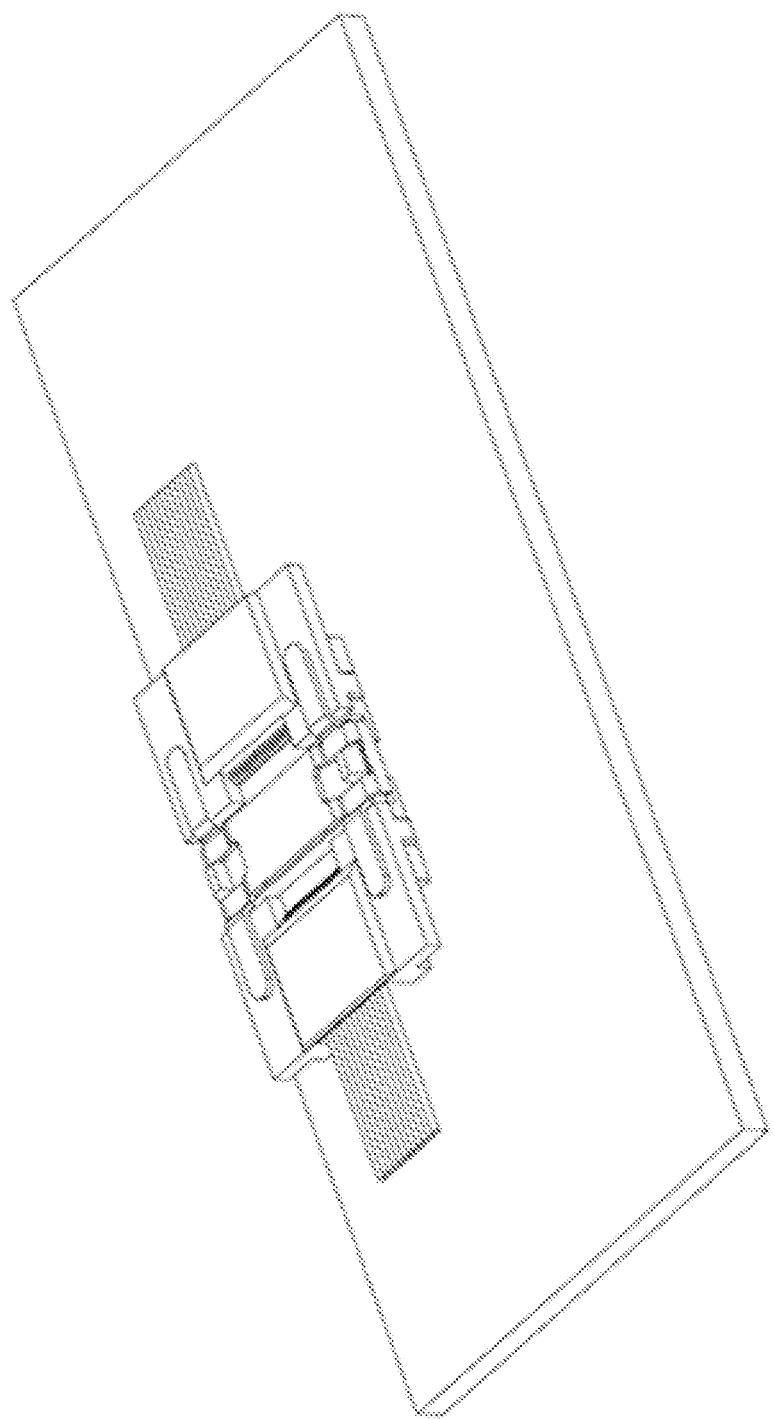
FIG. 13 is an assembly view of the third embodiment of the optical engine.
Figure 14:
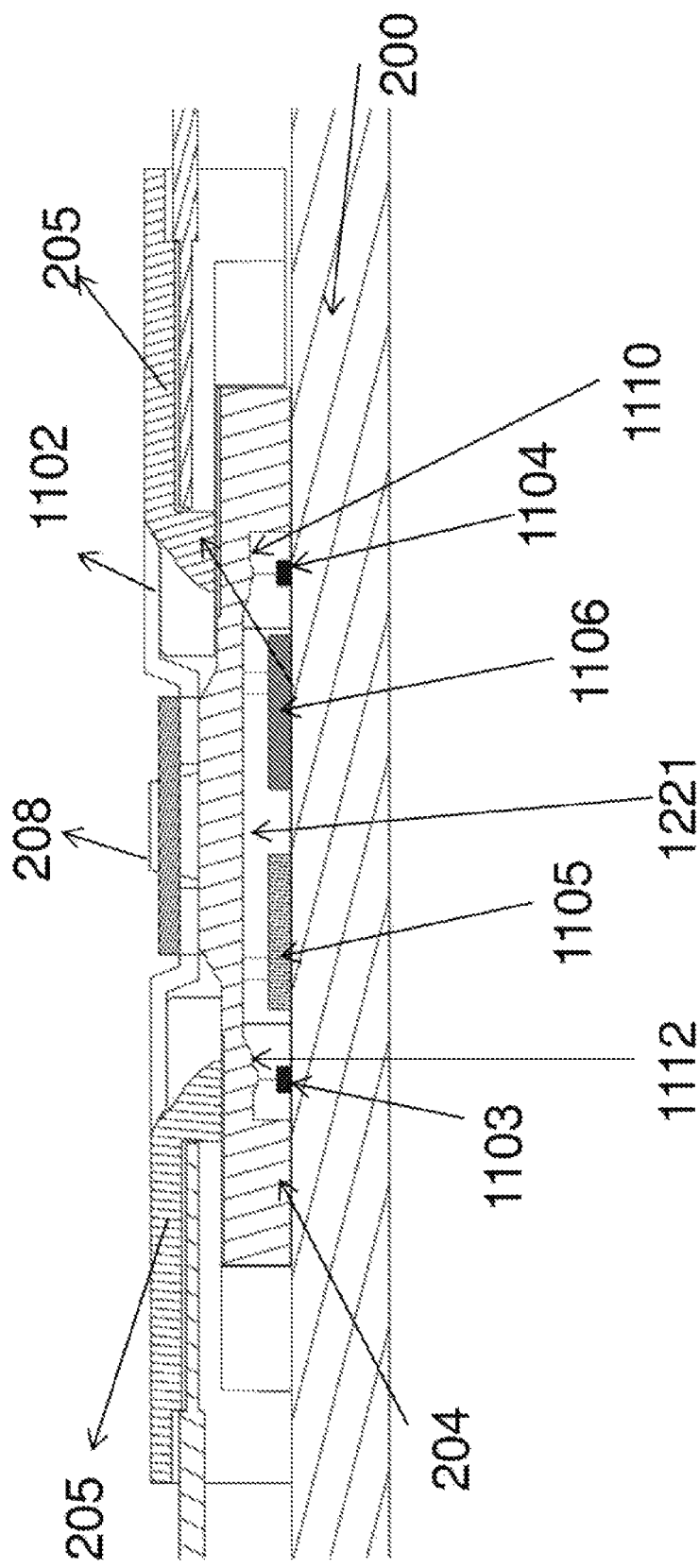
FIG. 14 is a cross sectional view of the third embodiment of the optical engine.

FIGS. 12-14 show different views of a third embodiment of the optical engine. According to this embodiment, there may be two arrays of optical semiconductor devices 1103, 1104 extending transversely along two opposite sides of the cavity 1221 of the device lens block 1201 perpendicular to the longitudinal axis X of the substrate 200, and two end-to-end fiber arrays 207 mounted on two end-to-end jumper lens blocks 205 and optically coupled with the two arrays of optical semiconductor devices 1103, 1104 respectively. The two arrays of optical semiconductor devices 1103, 1104 may be connected with two driving integrated circuits 1105, 1106 respectively. Two lens arrays 1110, 1112 may be formed on the device lens block 204 for coupling light between the two arrays of optical semiconductor devices 1103, 1104 and the two end-to-end fiber arrays 207 provided on the two end-to-end jumper lens blocks 205 respectively.

A metal latch 1202 can be used to hold the two jumper lens blocks 205 in a fixed position on the device lens block 1201. The metal latch 1202 may include two locking slots 209 formed on two opposite sides of the metal latch 1202 at a middle portion thereof for engagement with two locking hooks 208 formed on the device lens block 1201 at a middle portion thereof, and a first pair of flexible arms 1203 extending longitudinally from the middle portion at a first end thereof and a second pair of flexible arms 1204 extending longitudinally from the middle portion at a second end thereof for contacting and pressing the two jumper lens blocks 205 respectively on the device lens block 1201.

An optical transponder may be provided with the optical engine for data communication disclosed in the present application. Two 12 channels may be applied on an optical transponder. Transmitter Tx and receiver Rx can be assembled together on one piece. By using multiple pieces, fast data transmission/receiving can be realized. It can also help to increase the transmission distance.

An optical transceiver may also be provided with the optical engine for data communication disclosed in the present application. One array of optical semiconductor devices 202 can be an array of transmitting optoelectronic components for transmitting optical signals, and the other array of optical semiconductor devices 202 can be an array of receiving optoelectronic components for receiving optical signals.

While the optical engine for data communication has been shown and described with particular references to a number of preferred embodiments thereof, it should be noted that various other changes or modifications may be made without departing from the scope of the appended claims.

What is claimed is:

1. An optical engine for data communication comprising:
    (a) a substrate defining a longitudinal axis;
    (b) an array of optical semiconductor devices transversely mounted on the substrate, the optical semiconductor devices being selected from the group consisting of transmitting optoelectronic components, receiving optoelectronic components and a combination thereof;
    (c) a device lens block mounted on the substrate and formed with a cavity for accommodating therein the array of optical semiconductor devices, wherein two device lens arrays are formed on two opposite sides of the device lens block respectively;
    (d) a jumper lens block coupled with the device lens block at an upper surface thereof, wherein the jumper lens block is formed with a first alignment portion configured to snugly engage with a second alignment portion formed on the device lens block so as to facilitate precise optical alignment of the jumper lens block with the device lens block, and a lens array formed on a total internal reflective surface disposed at an angle of 45 degrees with respect to the substrate;
    (e) a fiber array mounted on the jumper lens block and optically coupled with the array of optical semiconductor devices via one of the device lens arrays of the device lens block and the lens array of the jumper lens block; and
    (f) a metal latch for holding the jumper lens block in a fixed position on the device lens block, wherein the metal latch comprises a first portion detachably coupled with the device lens block and a second portion contacting and biasing the jumper lens block against the device lens block;
    wherein the second alignment portion is in the form of two pairs of alignment notches formed on two opposite sides of the device lens block respectively, each pair of alignment notches being used to receive therein the first alignment portion of the jumper lens block which is in the form of a pair of alignment posts formed on the jumper lens block.

2. The optical engine as claimed in claim 1, wherein the fiber array is disposed parallel to the substrate.

3. The optical engine as claimed in claim 2, wherein the total internal reflective surface reflects light from the fiber array to the array of optical semiconductor devices when receiving optical signals, and reflecting light from the array of optical semiconductor devices to the fiber array when transmitting optical signals.

4. The optical engine as claimed in claim 3, wherein the lens array of the jumper lens block is an elliptical lens array.

5. The optical engine as claimed in claim 1, wherein one of the device lens arrays is used for transmitting optical signal, and the other one of the device lens arrays is used for receiving optical signal.

6. The optical engine as claimed in claim 1, comprising two arrays of optical semiconductor devices extending respectively along two opposite sides of the cavity perpendicular to the longitudinal axis of the substrate, and two end-to-end fiber arrays mounted on two end-to-end jumper lens blocks and optically coupled with the two arrays of optical semiconductor devices respectively.

7. The optical engine as claimed in claim 6, further comprising a metal latch for locking the jumper lens block in a fixed position on the device lens block, the metal latch comprising:
    (a) two locking slots formed on two opposite sides of the metal latch at a middle portion thereof for engagement with two locking features formed on the device lens block at a middle portion thereof; and
    (b) a first pair of flexible arms extending longitudinally from the middle portion at a first end thereof for contacting and pressing one of the two first jumper lens blocks on the device lens block.

8. The optical engine as claimed in claim 7, wherein the metal latch further comprising a second pair of flexible arms extending longitudinally from the middle portion at a second end thereof for contacting and pressing the other one of the two jumper lens blocks on the device lens block.

9. An optical transceiver comprising an optical engine as claimed in claim 6, wherein one array of optical semiconductor devices comprises an array of transmitting optoelectronic components for transmitting optical signals, and the other array of optical semiconductor devices comprises an array of receiving optoelectronic components for receiving optical signals.

10. An optical transponder module comprising an optical engine as claimed in claim 6.

11. The optical engine as claimed in claim 1, comprising two arrays of optical semiconductor devices extending respectively along two opposite sides of the cavity of the device lens block, and two fiber arrays mounted on two jumper lens blocks, wherein the jumper lens blocks comprise two lens arrays formed respectively on two total internal reflective surfaces disposed at an angle of 45 degrees with respect to the substrate, and wherein the two fiber arrays are optically coupled with the two arrays of optical semiconductor devices via the two lens arrays respectively.

12. The optical engine as claimed in claim 1, wherein the transmitting optoelectronic components are vertical cavity surface emitting lasers.

13. The optical engine as claimed in claim 12 wherein the transmitting optoelectronic components are connected to a driving integrated circuit.

14. The optical engine as claimed in claim 1, wherein the receiving optoelectronic components are photodiodes.

15. The optical engine as claimed in claim 14, wherein the receiving optoelectronic components are connected to a driving integrated circuit.

16. The optical engine as claimed in claim 1, wherein the first alignment portion of the jumper lens block is in the form of two alignment posts, and the second alignment portion of the device lens block is in the form of two alignment notches formed on two opposite sides of the device lens block respectively, whereby the two alignment posts of the jumper lens block are insertable into the two alignment notches of the device lens block respectively.

17. An optical engine for data communication comprising:
(a) a substrate defining a longitudinal axis;
(b) an array of optical semiconductor devices transversely mounted on the substrate, the optical semiconductor devices being selected from the group consisting of transmitting optoelectronic components, receiving optoelectronic components and a combination thereof;
(c) a device lens block mounted on the substrate and formed with a cavity for accommodating therein the array of optical semiconductor devices, wherein two device lens arrays are formed on two opposite sides of the device lens block respectively;
(d) a jumper lens block coupled with the device lens block at an upper surface thereof, wherein the jumper lens block is formed with a first alignment portion configured to snugly engage with a second alignment portion formed on the device lens block so as to facilitate precise optical alignment of the jumper lens block with the device lens block, and a lens array formed on a total internal reflective surface disposed at an angle of 45 degrees with respect to the substrate;
(e) a fiber array mounted on the jumper lens block and optically coupled with the array of optical semiconductor devices via one of the device lens arrays of the device lens block and the lens array of the jumper lens block;
(f) a metal latch for holding the jumper lens block in a fixed position on the device lens block, wherein the metal latch comprises a first portion detachably coupled with the device lens block and a second portion contacting and biasing the jumper lens block against the device lens block; and
(g) two arrays of optical semiconductor devices disposed end-to-end and optically associated with two side-by-side device lens block, and two side-by-side fiber arrays mounted on two side-by-side jumper lens blocks and optically coupled with the two arrays of optical semiconductor devices respectively.

18. An optical engine for data communication comprising:
(a) a substrate defining a longitudinal axis;
(b) an array of optical semiconductor devices transversely mounted on the substrate, the optical semiconductor devices being selected from the group consisting of transmitting optoelectronic components, receiving optoelectronic components and a combination thereof;
(c) a device lens block mounted on the substrate and formed with a cavity for accommodating therein the array of optical semiconductor devices, wherein two device lens arrays are formed on two opposite sides of the device lens block respectively;
(d) a jumper lens block coupled with the device lens block at an upper surface thereof, wherein the jumper lens block is formed with a first alignment portion configured to snugly engage with a second alignment portion formed on the device lens block so as to facilitate precise optical alignment of the jumper lens block with the device lens block, and a lens array formed on a total internal reflective surface disposed at an angle of 45 degrees with respect to the substrate;
(e) a fiber array mounted on the jumper lens block and optically coupled with the array of optical semiconductor devices via one of the device lens arrays of the device lens block and the lens array of the jumper lens block; and
(f) a metal latch for holding the jumper lens block in a fixed position on the device lens block, wherein the metal latch comprises a first portion detachably coupled with the device lens block and a second portion contacting and biasing the jumper lens block against the device lens block;
wherein the metal latch comprises
(a) two locking slots formed on two opposite sides of the metal latch at a middle portion thereof for engagement with two locking hooks formed on the device lens block at a middle portion thereof; and
(b) two flexible arms extending longitudinally from the middle portion at a first end thereof, at least one protrusion formed on a bottom surface of each arm for contacting and pressing the jumper lens block on the device lens block, two inturned ends being formed on free ends of the two arms for abutting against an end surface of the jumper lens block.

19. The optical engine as claimed in claim 18, wherein the metal latch further comprises two protrusions extending longitudinally from the two locking slots respectively to facilitate unlatching of the metal latch from the device lens block.

20. The optical engine as claimed in claim 18, wherein the metal latch further comprises two U-shaped springs extending from the middle portion at a second end thereof for contacting and biasing the device lens block against the substrate.

* * * * *